(12) United States Patent
Edler

(10) Patent No.: US 7,217,745 B2
(45) Date of Patent: May 15, 2007

(54) LASER-MARKABLE PLASTICS AND THEIR PREPARATION AND USE

(75) Inventor: Gerhard Edler, Trebur (DE)

(73) Assignee: Merck Patent Gesellschaft Mit Beschraenkter Haftung, Darmstadt (DE)

(*) Notice: Subject to any disclaimer, the term of this patent is extended or adjusted under 35 U.S.C. 154(b) by 875 days.

(21) Appl. No.: 10/017,481

(22) Filed: Dec. 18, 2001

(65) Prior Publication Data

US 2002/0107305 A1    Aug. 8, 2002

(30) Foreign Application Priority Data

Dec. 18, 2000  (DE) .............................. 100 63 105

(51) Int. Cl.
 *C08K 3/34* (2006.01)
 *C09D 5/36* (2006.01)
(52) U.S. Cl. .................. 523/171; 523/205; 523/209; 523/216; 524/413; 524/430; 524/431; 524/445; 524/447; 524/449
(58) Field of Classification Search ............ 523/171, 523/205, 209, 216; 524/413, 430–431, 449
See application file for complete search history.

(56) References Cited

U.S. PATENT DOCUMENTS

| 5,075,195 | A | * | 12/1991 | Babler et al. | ............... 430/200 |
| 6,291,551 | B1 | * | 9/2001 | Kniess et al. | ............... 523/216 |
| 6,294,010 | B1 | | 9/2001 | Pfaff et al. | |
| 6,444,068 | B1 | * | 9/2002 | Koops et al. | ................. 156/99 |
| 6,545,065 | B2 | * | 4/2003 | Solms et al. | ............... 523/171 |

FOREIGN PATENT DOCUMENTS

WO    WO98/03583    1/1998

OTHER PUBLICATIONS

European Search Report, Mar. 19, 2002.

* cited by examiner

*Primary Examiner*—Peter Szekely
(74) *Attorney, Agent, or Firm*—Millen, White, Zelano & Branigan, P.C.

(57) ABSTRACT

The invention relates to a laser-markable transparent or translucent plastics which comprise pearlescent pigments in combination with laser-sensitive pigments which themselves do not exhibit any pearlescent effect. The pigment combination considerably improves the scanner legibility of applied laser markings. The invention also relates to a process for preparing the plastics, to the use of the plastics for producing moldings, to moldings produced in this way, and generally to the use of a mixture made from pearlescent pigment and laser-sensitive pigment in laser-markable plastics, for improving the scanner legibility of laser markings applied to the plastics.

11 Claims, No Drawings

LASER-MARKABLE PLASTICS AND THEIR PREPARATION AND USE

The present invention relates to laser-markable transparent plastics, to the production and use of these plastics, to moldings composed of the plastics, and to the use of a mixture of pearlescent pigment and laser-sensitive pigment.

The identification marking of products is becoming increasingly important in almost every branch of industry. For example, it is often necessary to apply marks such as production dates, expiry dates, bar codes, company logos, serial numbers, etc. The requirements placed upon the amount of data to be transferred are constantly rising, and this information is therefore compressed into codes of constantly increasing complexity, such as bar codes or data matrix codes. Most of these markings are currently executed using conventional techniques, such as printing or labelling. However, contactless and very rapid and flexible marking with lasers is gaining growing importance, especially for plastics. This technique permits high-speed application of graphics, e.g. bar codes, without any additional pretreatment of the plastic to improve adhesion, even on non-planar surfaces. The inscription is durable and abrasion-resistant, since it is within the body of the plastic.

For automatic reading of the laser markings applied to the plastics use is made of laser scanners or CCD cameras, for example. These permit rapid recognition of relatively large amounts of data. All of the recognition systems need adequate contrast between the information media to be detected, e.g. bar code lines, and the base material, to ensure a sufficiently high level of read-off reliability. This requirement is relatively easy to meet for any detector using a white base material, but on colored base materials it is difficult, and on transparent base materials no read-off can be achieved using a laser scanner.

However, transparent or translucent packaging has the advantage of making it easy to detect the shape and the fill height of the contents.

The application of variable data by means of label is a complicated and expensive process, and is therefore increasingly being replaced by laser marking. This method is rapid, simple and inexpensive and has the added advantage of linking the information immutably to the material. If the data are applied with the aid of printing techniques, it is possible, even in the case of relatively transparent colorations, to apply a code with inverse legibility by using white printing ink. However, dark markings are preferably produced using the laser on the plastics which are most frequently found in the packaging sector, but in the case of transparent colorings the contrast between the transparent plastic and the dark (light-absorbing) bar code lines is then too small for successful scanner recognition, since there is insufficient reflection from the plastic.

For the laser-marking of plastics there are specific known pigments which absorb the radiation from the respective laser and bring about either a dark-colored or a light-colored marking of the plastic. Examples of these are lamellar mica pigments, which are composed of uncoated or coated mica, but use may also be made of other specific pigments for laser-marking which bring about a color change within the plastic. Laser pigments of the type described are obtainable as Iriodin® LS from Merck KGaA, Darmstadt, Germany.

These pigments permit the marking of plastics which are not in themselves markable, or, in plastics which are markable per se, bring about an increase in the contrast between laser marking and base material. However, in particular for transparent or translucent plastics, it is necessary to increase the contrast further in order to make the markings scanner-legible.

It is an object of the present invention, therefore, to provide laser-markable transparent or translucent plastics in which there is a marked improvement in the scanner-legibility of laser markings, due to higher contrast with the unmarked base material, and without any excessive reduction in the transparency of the plastic.

OBJECTS PARAGRAPH

Upon further study of the specification and appended claims, further objects and advantages of this invention will become apparent to those skilled in the art.

Surprisingly, it has been found that these and other objects can be achieved by using the abovementioned pigments, specifically developed for laser marking, in combination with pearlescent pigments.

The invention therefore provides laser-markable transparent or translucent plastics which comprise pearlescent pigments in combination with laser-sensitive pigments which themselves do not exhibit any pearlescent effect.

Pearlescent pigments, which are also termed interference pigments, are lamellar pigments in which there is an arrangement of alternating layers of a material with a low refractive index and of a material with a high refractive index, or of a metal on an absorbent lamellar substrate which is opaque or semi-opaque. Examples of suitable substrates are phyllosilicates, such as mica, synthetic mica, talc, sericite, kaolin, glass, and other siliceous materials. The layers deposited thereon may be composed of colored or colorless metal oxides, e.g. $TiO_2$, $Fe_2O_3$, $Fe_3O_4$, $SnO_2$, $Cr_2O_3$, $ZnO$, $CuO$, $NiO$, or of other metal oxides, on their own or in a mixture. These pigments are known by way of example from the German Patents and Patent Applications 14 67 468, 19 59 998, 20 09 566, 22 14 454, 22 15 191, 22 44 298, 23 13 331, 25 22 572, 31 37 808, 31 37 809, 31 51 343, 31 51 354, 31 51 355, 32 11 602, 32 35 017 and P 38 42 330, and are available commercially, e.g. with the trade mark Iriodin® from Merck KGaA, Darmstadt, Germany. Particularly preferred pigment preparations comprise $TiO_2$/mica, $Fe_2O_3$/mica and/or $TiO_2$/$Fe_2O_3$-mica pigments.

Although the prior art also uses pearlescent pigments for the pigmentation of laser-markable plastics, the combined use of the pigments to be used according to the invention have not been described in, nor been rendered obvious by, the prior art since it could not be expected that the abovementioned object would be achieved by using the pigment combination to be used according to the invention.

The laser-markable plastics of the invention preferably comprise from 0.1 to 2% by weight of pearlescent pigment and from 0.1 to 1.0% by weight of laser-sensitive pigment, based in each case on the weight of the plastic. Lower contents of pearlescent pigment may not produce an adequate effect, and higher contents may give an excessive reduction in the transparency of the plastic.

The plastics are preferably polyethylene, polypropylene, polyethylene terephthalate, polycarbonate or PVC.

The pearlescent pigment used may be the pearlescent pigments described above and known from the prior art. This pigment is preferably composed of titanium-dioxide-coated lamellae made of naturally occurring or synthetic mica, aluminum oxide, silicon dioxide, bismuth oxide chloride lamellae and/or basic lead carbonate in lamella form.

The laser-sensitive pigment component used is advantageously uncoated mica or one or more pigments made of metal oxide-coated mica, examples of a metal oxide which may be used being $TiO_2$, Sn/Sb mixed oxide, Sn/In mixed oxide, etc. However, the nature and thickness of the coating here is to be selected so that no pearlescent effect occurs. It is also possible to use other pigments or additives, for example as listed in the Patent Application DE-A-197 26 136, as long as these lead to a visible change in color of the plastic upon laser application. Preferred laser-sensitive pigments are those which are obtainable as Iriodin® LS from Merck KGaA, Darmstadt, Germany.

The plastics of the invention may be marked by the known laser-marking processes, using various laser types, for example by means of $CO_2$ laser, Nd:YAG laser, pulsed TEA-$CO_2$ laser, eximer laser or other known laser types. The marking may take place by the mask process or the beam deflection process, but is not limited thereto.

The invention also relates to a process for preparing the laser-markable plastics of the invention by mixing thermoplastic pellets with the pearlescent pigment and the laser-sensitive pigment, and then shaping the material with exposure to heat.

The invention also provides the use of the laser-markable plastics for producing moldings which are markable with the aid of laser radiation, and also the corresponding moldings. The plastics are particularly suitable for producing hollow articles used as packaging material. The advantageous properties of the plastic of the invention firstly give high scanner legibility and secondly mean that the transparency of the plastics is sufficient for the contents of the corresponding hollow articles to be detected.

The invention relates to the general use of a mixture of pearlescent pigment and laser-sensitive pigment in laser-markable plastics for improving the scanner legibility of laser markings applied to the plastics.

INCORPORATED BY REFERENCE

The entire disclosure[s] of all applications, patents and publications, cited above or below, and of corresponding German Application No. 100 63 105.3, filed Dec. 18, 2000 is hereby incorporated by reference.

EXAMPLES

In the foregoing and in the following examples, all temperatures are set forth uncorrected in degrees Celsius; and, unless otherwise indicated, all parts and percentages are by weight.

Form R The invention will be described in more detail below using examples.

Example 1

A bottle made of transparent polyethylene was pigmented for laser marking, using Interference Yellow as pearlescent pigment and Iriodin® LS 825 as laser-sensitive pigment. The control used was a bottle made of transparent polyethylene, pigmented solely with Iriodin® LS 825. A bar code applied by means of Nd:YAG laser was readily legible on the polyethylene bottle pigmented with pearlescent pigment, whereas the bar code was illegible on the polyethylene bottle without pearlescent pigment. However, the bar codes have the same level of darkness on the two bottles, and the ease of detection of the fill level of the clear colorless liquid in the two bottles is approximately identical. The combined use of pearlescent pigment and laser-sensitive pigment markedly increases the contrast between bar code and base material, making the inscription machine-legible.

Example 2

A polyethylene bottle pigmented with 0.4% of a fine-particle, silvery white pearlescent pigment and 0.3% of Iriodin® LS 810 was marked with a bar code, with the aid of a pulsed $CO_2$ laser (mask process). The bar code could be read with almost 100% read-off reliability using a variety of scanner reader devices. None of the devices used could read the bar code on a comparative bottle which comprised only the Iriodin LS 810 and no pearlescent pigment. The ease of detection of the fill level and of the color of colored liquids, and also of clear colorless liquids, was identical for the two bottles.

The preceding examples can be repeated with similar success by substituting the generically or specifically described reactants and/or operating conditions of this invention for those used in the preceding examples.

From the foregoing description, one skilled in the art can easily ascertain the essential characteristics of this invention and, without departing from the spirit and scope thereof, can make various changes and modifications of the invention to adapt it to various usages and conditions.

The invention claimed is:

1. A laser-markable transparent or translucent plastic composition, which comprises a transparent or translucent plastic and a laser absorbing pigment mixture, said mixture consisting of a pearlescent pigment in combination with a laser-sensitive pigment, wherein the pearlescent pigment comprises a phyllosilicate substrate having one or more layers of metal oxide thereon, wherein the laser-sensitive pigment is composed of mica coated with one or more metal oxides, the nature and thickness of the coating(s) on the mica being such that no pearlescent effect occurs from the laser-sensitive pigment, and wherein the laser-markable plastic composition comprises from 0.1 to 2% by weight of the pearlescent pigment and from 0.1 to 1.0% by weight of the laser-sensitive pigment, based on the weight of the plastic.

2. A laser-markable plastic composition according to claim 1, wherein the plastic is polyethylene, polypropylene, polyethylene terephthalate, polycarbonate or PVC.

3. A laser-markable plastic composition according to claim 1, wherein the laser-sensitive pigment is coated with $TiO_2$, Sn/Sb mixed oxide or Sn/In mixed oxide.

4. Process for preparing a laser-markable plastic composition according to claim 1, which comprises mixing thermoplastic pellets of the plastic with the pearlescent pigment and the laser-sensitive pigment, and then shaping the mixture with exposure to heat.

5. A method for producing a molding which is markable with the aid of laser radiation, which comprises molding a laser-markable plastic composition of claim 1.

6. A molding composed of a laser-markable plastic composition according to claim 1.

7. A method comprising scanner reading a laser-marking on a plastic, wherein the plastic is a laser-markable plastic composition of claim 1.

8. A laser-markable plastic composition according to claim 1, wherein the pearlescent pigment is $TiO_2$-coated mica, $Fe_2O_3$-coated mica or $TiO_2$-coated and $Fe_2O_3$-coated mica.

9. A laser-markable plastic composition according to claim 1, wherein the only pigments in said plastic composition are the pearlescent pigment and the laser-sensitive pigment.

10. A laser-markable plastic composition according to claim 1, wherein the phyllosilicate substrate of the pearlescent pigment is selected from mica, synthetic mica, talc, sericite, or kaolin.

11. A laser-markable plastic composition according to claim 1, wherein the pearlescent pigment contains one or more layers of the following metal oxides: $TiO_2$, $Fe_2O_3$, $Fe_3O_4$, $SnO_2$, $Cr_2O_3$, ZnO, CuO, or NiO, or mixtures thereof.

* * * * *